(12) United States Patent
Li et al.

(10) Patent No.: US 8,045,046 B1
(45) Date of Patent: Oct. 25, 2011

(54) FOUR-DIMENSIONAL POLYNOMIAL MODEL FOR DEPTH ESTIMATION BASED ON TWO-PICTURE MATCHING

(75) Inventors: Pingshan Li, Sunnyvale, CA (US); Earl Wong, San Jose, CA (US); Kensuke Miyagi, Cupertino, CA (US)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 12/759,041

(22) Filed: Apr. 13, 2010

(51) Int. Cl.
*H04N 5/232* (2006.01)
*G03B 13/00* (2006.01)

(52) U.S. Cl. .................................................. 348/349

(58) Field of Classification Search .................... 348/42, 348/46, 49, 345, 347, 349, 352; 382/154
See application file for complete search history.

(56) References Cited

U.S. PATENT DOCUMENTS

| 7,303,131 | B2 | 12/2007 | Carlson et al. | |
|---|---|---|---|---|
| 2006/0285741 | A1* | 12/2006 | Subbarao | 382/154 |
| 2007/0036427 | A1 | 2/2007 | Nakamura et al. | |
| 2007/0189750 | A1 | 8/2007 | Wong et al. | |
| 2009/0268985 | A1 | 10/2009 | Wong et al. | |
| 2010/0053417 | A1* | 3/2010 | Baxansky | 348/345 |
| 2010/0080482 | A1 | 4/2010 | Wong et al. | |
| 2010/0194971 | A1* | 8/2010 | Li et al. | 348/349 |

FOREIGN PATENT DOCUMENTS

| JP | 8329875 A | 12/1996 |
|---|---|---|
| WO | 2007057808 A2 | 5/2007 |

OTHER PUBLICATIONS

Subbarao et al., "Depth from Defocus: A Spatial Domain Approach", International Journal of Computer Vision, vol. 13, No. 3, pp. 271-294, 1994.*
Tsai et al., "A Moment-Preserving Approach for Depth from Defocus", Pattern Recognition, vol. 31, No. 5, pp. 551-560, 1998.*
Xian, Tao et al.—"Depth-from-Defocus: Blur Equalization Technique"—Proc. of SPIE, vol. 6382, 2006, pp. 63820E-1-63820E-10.
Deschenes, F. et al.—"Simultaneous Computation of Defocus Blur and Apparent Shifts in Spatial Domain"—15th International Conf. on Vision Interface, May 27-29, 2002, Calgary, Canada.
Leroy, Jean-Vincent et al.—"Real Time Monocular Depth from Defocus"—Lecture Notes in Computer Science, vol. 5099, proc. of the 3rd International conf. on Image and Signal Processing, pp. 103-111, 2008.

(Continued)

*Primary Examiner* — Timothy J Henn
(74) *Attorney, Agent, or Firm* — John P. O'Banion

(57) ABSTRACT

Camera depth estimation is performed in response to picture matching based on blur difference computed between images captured at different focal positions. A blur difference model is stored in the camera based on characterization of the camera with a series of matching curves in which blur difference varies depending on the focal length, aperture, subject distance, and lens focus position. A four-dimensional polynomial model is created to fit the matching curves for use in estimating subject distance. During operation, images are captured for use in estimating subject distance. Motion compensation is applied and blur difference is determined. Blur difference is utilized in the polynomial model to estimate subject distance. Subject distance estimates can be output or utilized within an auto focus process to provide accurate focus adjustments.

20 Claims, 8 Drawing Sheets

OTHER PUBLICATIONS

Gokstorp, Mark—"Computing depth from out-of-focus blur using a local frequency representation"—Proc. of the 12th IAPR International Conf. on Pattern Recognition, vol. 1, Conf. A: Computer Vision & Image Processing, vol. 1, Oct. 9-13, 1994, Jerusalem.

Park, Soon-Yong—"An image-based calibration technique of spatial domain depth-from-defocus"—Pattern Recognition Letters, vol. 27, 2006, pp. 1318-1324.

Zhang, Quanbing et al.—"A Novel Technique of Image-Based Camera Calibration in Depth-from-Defocus"—First International Conf. on Intelligent Networks and Intelligent Systems, Nov. 1-3, 2008, pp. 483-486.

Zhou, D. et al.—"Depth from Defocus Estimation in Spatial Domain"—Computer Vision and Image Understanding, vol. 81, No. 2, Feb. 1, 2001, pp. 143-165.

European Search Report, EP application No. 10 15 0104, with claims searched, report issued May 6, 2010, pp. 1-14.

* cited by examiner

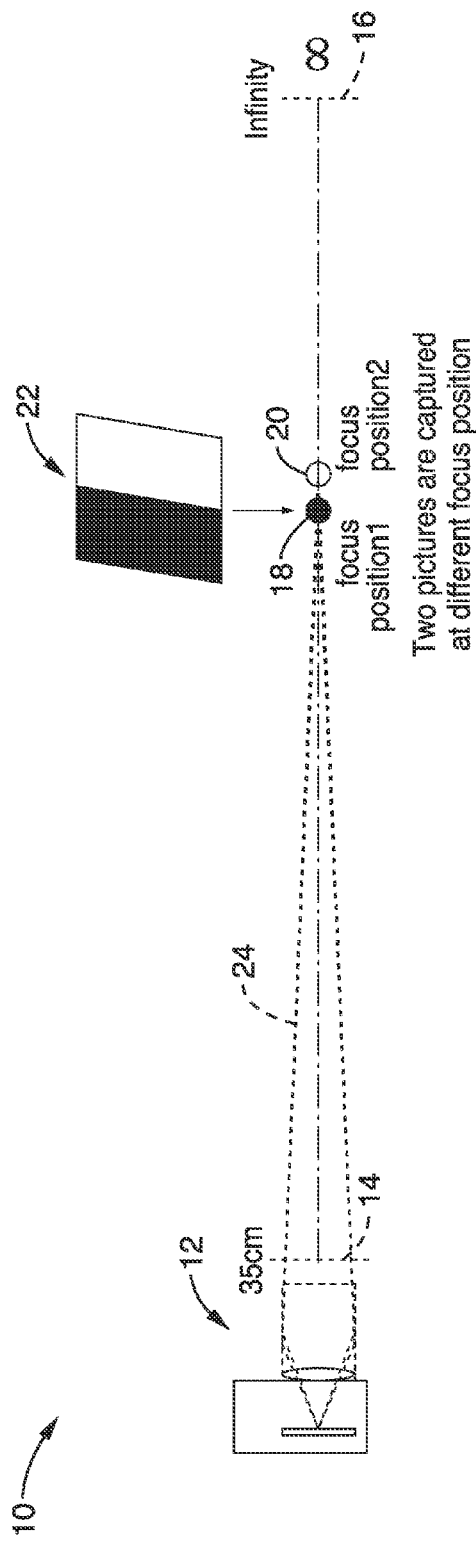
FIG. 1
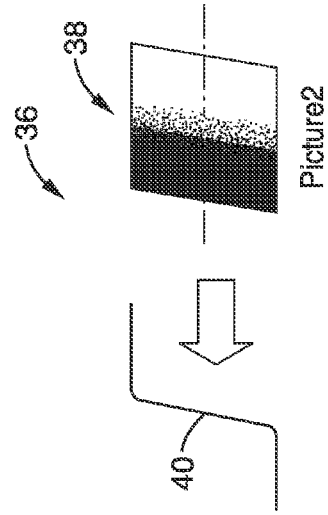
FIG. 2A
FIG. 2B

FOUR-DIMENSIONAL POLYNOMIAL MODEL FOR DEPTH ESTIMATION BASED ON TWO-PICTURE MATCHING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to camera depth estimation, and more particularly to depth estimation using picture matching.

2. Description of Related Art

To achieve the most desirable outcome, a camera must be properly focused when capturing an image. Numerous systems have been developed for estimating and/or attaining a proper camera focus. A brief discussion follows of the elements within a typical camera-lens system and their associated characteristics.

Perhaps the principle optical parameters of a photographic lens can be considered to be its maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera. The focal length of the camera can be single focus or variable, as in response to adjusting a so-called "zoom" control.

One form of simple lens, which is technically a lens having a single element but is typically used more broadly, has a single focal length and is also referred to as a "prime lens". In focusing a camera using a single focal length lens, the distance between lens and the focal plane is changed resulting in a change in the focus point of the photographic subject onto that plane. Thus, although the single focal length lens has a fixed optical relation and focal length, it is used in the camera to focus on subjects across a range of focus distances. Consequently, one should not confuse the focal distance(s) of a lens with the range of focus obtainable on a camera using that lens, whereby adjusting the position of that lens in relation to the focal plane alters focus distance.

To use a single focal length lens one adjusts the aperture to select the amount of light with respect to desired shutter speed, and then adjusts focus (focuses) according to subject-distance after which the shutter is "released" and the image is captured. It will be appreciated that the trigger for image capture is referred to herein as "shutter release", although the process of capturing an image in a digital camera is in large measure performed electronically. Often a macro setting is provided with a different focal length selection, on an otherwise single focal length lens, for taking close-up shots. A telephoto lens provides a very narrow angle of view with high magnification for filling the frame with images from distance objects.

Multi-focal length lenses are usually referred to as "zoom" lenses, because image magnification can be "zoomed", or "unzoomed" as desired to obtain higher, or respectively lower magnification. Zoom lenses allow the user to select the amount of magnification of the subject, or put another way, the degree to which the subject is zoomed to fill the frame. It is important to understand that the zoom function of these lenses, or camera-lens systems, is conceptually separate from both the focus control and the aperture control.

Regardless of whether a single-focal length lens or multi-focal length lens is utilized, it is necessary to properly focus the lens for a given subject-distance. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting, there exists a single optimum focus setting for a given camera to subject distance (referred to as subject-distance). Portions of the subject which are closer or farther than the focus distance of the camera will show up in the captured images subject to some degree of blurring, the extent of which depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

Originally, camera focus could only be determined and corrected in response to operator recognition and manual focus adjustments. However, due to the critical nature of focus on the results, focusing aids were readily adopted. More recently, imaging devices often provide the ability to automatically focus on the subject, a function which is generically referred to today as "auto focus". Cameras often also provide a combination of automatic and manual controls, such as the use of aperture priority and shutter priority modes. Focus continues to be a point of intense technical development as each of the many existing auto focus mechanisms are subject to shortcomings and tradeoffs.

There are two general types of auto focus (AF) systems which exist, active auto focus and passive auto focus. In active auto focus, one or more image sensors is utilized to determine distance to the focal point, or otherwise detect focus external of the image capture lens system. Active AF systems can perform rapid focusing although they will not typically focus through windows, or in other specific applications, since sound waves and infrared light are reflected by the glass and other surfaces. In passive auto focus systems the characteristics of the viewed image are used to detect and set focus.

The majority of high-end SLR cameras currently use through-the-lens optical AF sensors, which for example, may also be utilized as light meters. The focusing ability of these modern AF systems can often be of higher precision than that achieved manually through an ordinary viewfinder.

One form of passive AF utilizes phase detection, such as by dividing the incoming light through a beam splitter into pairs of images and comparing them on an AF sensor. Two optical prisms capture the light rays coming from the opposite sides of the lens and divert it to the AF sensor, creating a simple rangefinder with a base identical to the diameter of the lens. Focus is determined in response to checking for similar light intensity patterns and phase differences calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing is slower than active AF, in particular when operating under dim light, but is a common method utilized in low end imaging devices. Passive systems often make poor focusing decisions in low contrast or low light conditions.

In addition, many focusing systems perform poorly when the subject is in motion, such as in regard to "action shots", for example children at play, sports, animals in the wild, and so forth.

Accordingly, a need exists for improved depth estimation and/or auto focusing techniques which provide rapid and accurate subject-distance estimations and/or focus control under a wide range of conditions and subject motion. The present invention fulfills those needs, as well as others, and overcomes shortcomings of previous camera focus techniques.

BRIEF SUMMARY OF THE INVENTION

Camera depth estimation is presented which is based on two-picture matching and blur difference. Depth estimation can be utilized for displaying focus information to a user (e.g., under a manual or semi-automatic focus setting), and/or in the process of automatically adjusting camera focus (e.g., under an autofocus setting). The inventive method computes a blur difference between two captured images, temporarily stored, at different focus positions. A motion compensation technique is applied between the images to obtain a proper focus irrespective of motion. Blur difference is determined which varies depending on the focal length, aperture, subject distance, and lens focus position, and which can be approximated by a multi-dimensional polynomial model, preferably a four-dimensional polynomial model, within the present invention. Less preferably, the invention can be practiced with a three-dimensional polynomial model, such as in response to use of a single focal length lens. It will be appreciated also that the invention can be implemented with more than a four dimensional polynomial model in applications in which camera focus is impacted by other camera variables.

The model can be used to calculate subject depth and is preferably calibrated across a range of focus distances, such as by capturing a series of step edge images. The instant application extends applicability of depth estimation from two-picture matching by proposing practical solutions for mis-registration between the two pictures due to motion and for dealing with variable camera settings (zoom and aperture).

It should be appreciated that the images captured for estimating subject distance according to the invention, are preferably not captured in the same manner as a user selected image is captured for use. By way of example, when a user selects a subject to photograph, they would frame that subject in the viewfinder and typically partially depress the "shutter release" button to activate focus controls. During this time a camera, according to at least one embodiment of the invention, would "capture" at least two images at different focus settings. These images are only used internally by the camera device in performing the inventive method for computing subject distance according to the present invention, and would not normally be accessible in the set of images captured by the user, such as in response to entering an "image review" mode of the camera. When proper focus is established, such as from focus control according to the invention, and in response to detecting that the "shutter release" button has been fully depressed; then the user selected subject image is captured in the traditional sense and stored within the camera for later review, uploading, printing and whatever the user desires. Once the user selected subject image is captured, the images "captured" temporarily for subject distance estimation are no longer needed and thus are preferably discarded to conserve memory.

The invention is amenable to being embodied in a number of ways, including but not limited to the following descriptions.

One embodiment of the invention is an apparatus for electronically capturing images, such as a still image camera or a video camera having a still image capture mode, comprising: (a) an imaging element disposed on an image capture apparatus; (b) a focus control element coupled to the imaging element; (c) a computer processor coupled to the imaging element and focus control element; (d) a memory coupled to the computer processor and configured for retaining images captured from the imaging element and for retaining programming executable by the computer processor; (e) a multi-dimensional focus matching model retained in memory as a multi-dimensional polynomial fitting blur differences from image matching curves captured across a range of different focal lengths; and (f) programming executable on the computer processor for, (f)(i) capturing multiple object images (for temporary use in the estimation process), including at least a first and second image, and registering focal length and aperture of the object images, (f)(ii) compensating for motion between the multiple object images, (f)(iii) determining blur difference between the multiple object images, and (f)(iv) automatically estimating subject distance in response to applying blur difference to the multi-dimensional focus matching model. The multiple object images comprise at least two images captured at different focus positions using an identical aperture setting and focal length. Subject depth estimation, may be utilized within the camera for displaying subject distance information or within autofocus control programming, in which the computer processor automatically adjusts the focus of the camera apparatus in response to subject distance estimation. Alternatively, the subject depth estimation may be utilized with manual-auto combination modes, such as within a mode which provides semi-automatic focus adjustments.

The image matching curves describe a relationship between iteration number and lens focus position, such as determined from a characterization process for the camera and its lens. A focus matching model is constructed according to the invention to represent blur contributions in relation to focus distance for given camera settings. In at least one preferred implementation the multi-dimensional blur difference model comprises a four-dimensional polynomial function of blur difference with respect to subject depth, focus position, focal length, and aperture.

In at least one implementation, motion compensation is performed between the images, wherein at least the focus area of the first image is located as a fit within the second image, or alternatively, a portion of the second image is located as a fit within the focus area of the first image. Resultant blur difference computations are made more accurate in response to motion compensation as blur is more accurately rendered with static image content between the portions of the first and second image being compared after compensation. In at least one implementation, motion compensation is performed in response to one or more convolutions by a blur kernel to determine blur difference. In at least one implementation motion compensation is performed based on the relation $$(\hat{x}_V, \hat{y}_V) = \underset{(x_V, y_V)}{\operatorname{argmin}} \|f_i(x,y) - f_j(x-x_V, y-y_V)\|,$$

in which two images $f_i$ and $f_j$ are captured in a sequence, with i<j indicating image i is taken earlier in the sequence than image j, $\|.\|$ is a norm operator that evaluates the matching error. The focus area of $f_i$ is compared with a shifted region of the same size from $f_j$. The amount of shift $(x_v, y_v)$ is up to e.g. ±5 pixels in horizontal and vertical directions. For all the shifting positions, one $(\hat{x}_v, \hat{y}_v)$ is found that yields the minimum matching error. The shifted image $f_j^V(x,y)=f_j(x-\hat{x}_v, y-\hat{y}_v)$ represents the shifted $f_j$ with the region best matching the focus area of $f_i$.

In at least one implementation, blur difference $I_{A\_B}$ is computed as, $$I_{A\_B} = \min_{(x_V, y_V)} \left[ \underset{l}{\operatorname{argmin}} \left\| f_A(x,y) \underbrace{* K(x,y) * K(x,y) * \ldots * K(x,y)}_{l \text{ convolutions}} - f_B(x-x_V, y-y_V) \right\| \right]$$

in which K are convolution operations, (x,y) is amount of pixel location shift, $(x_v, y_v)$ is the amount of pixel location shift within a given search range v, $f_A$ is a first picture and $f_B$ is a second picture.

In at least one implementation, blur difference $I_{A\_B}$ is approximated in response to letting $f_B^V(x,y)=f_B(x-\hat{x}_v, y-\hat{y}_v)$, and determining blur difference by the following relation, $$I_{A\_B} = \underset{l}{\operatorname{argmin}} \|f_A * K * K * \ldots * K - f_B^V\|$$

in which K are convolution operations, (x,y) is amount of pixel location shift, $(x_v, y_v)$ is the amount of pixel location shift within a given search range v, $f_A$ is a first picture, $f_B$ is a second picture, and $f_B^V$ is the second picture in response to motion compensation.

In at least one implementation, blur difference is determined in response to whether image $f_i$ or $f_j$ is sharper, which can be determined in response to, (a)

$$I_1 = \underset{l}{\operatorname{argmin}} \left\| f_i \underbrace{* K * K \ldots * K}_{l \text{ convolutions}} - f_j^V \right\|,$$

and (b)

$$I_2 = \underset{l}{\operatorname{argmin}} \left\| f_j^V \underbrace{* K * K * \ldots * K}_{l \text{ convolutions}} - f_i \right\|,$$

in which $I_1$ and $I_2$ are first and second blur difference values, $f_i$ and $f_j$ are the two images captured, $f_j^V$ is the captured image $f_j$ in response to motion compensation, and K are blur kernels. If $I_1$ is larger than $I_2$, then $f_i$ is sharper than $f_j$, and the blur difference will be given by $I_1$, otherwise if $I_2$ is larger than $I_1$, then $I_2$ is sharper and the blur difference will be given by $-I_2$. The sign of blur difference values indicates which image is sharper.

In at least one implementation, the focus matching model comprises a multi-dimensional polynomial function determined in response to the steps comprising: (a) finding coefficients for the multi-dimensional polynomial to fit the blur difference matching curves; (b) determining fitting errors and discarding outliers; and (c) repeating the above steps until polynomial fitting converges to a desired accuracy with the blur difference matching curves.

In at least one implementation, the focus matching model is generated by performing a characterization comprising: (a) obtaining images of a calibration target in a sequence of calibration target images taken across a range of camera focus settings with respect to focus distance, aperture, subject depth and zoom settings; (b) determining blur difference matching curves between each of these images; and (c) generating said multi-dimensional model based on matching the blur differences for the sequence of calibration target images.

One embodiment of the invention is an apparatus for electronically capturing images, comprising: (a) an imaging element disposed within a camera apparatus; (b) a focus control element coupled to the imaging element; (c) a computer processor coupled to the imaging element and focus control element; (d) a memory coupled to the computer processor and configured for retaining images captured from the imaging element and for retaining programming executable by the computer processor; (e) a multi-dimensional focus matching model retained in memory as a multi-dimensional polynomial fitting blur differences from image matching curves captured across a range of different focal lengths which describe a relationship between iteration number and lens focus position; and (f) programming executable on the computer processor for, (f)(i) capturing at least two images, first image and second image, at different focus positions using an identical aperture setting and focal length, (f)(ii) compensating for motion between the two images, (f)(iii) determining blur difference between these two images, (f)(iv) automatically estimating subject distance in response to applying blur difference to the multi-dimensional focus matching model, and (f)(v) automatically adjusting focus of the camera by communicating focus control changes to the focus control element in response to estimation of subject distance.

One embodiment of the invention is a method of estimating subject depth within a camera apparatus for electronically capturing images, comprising: (a) generating a multi-dimensional focus matching model for retention within the camera apparatus as a multi-dimensional polynomial which fits blur difference information arising from image matching curves captured across a range of different focal lengths; and (b) capturing multiple object images, including at least a first and second image, and registering focal length and aperture; (c) compensating for motion between the multiple object images; (d) determining blur difference between the multiple object images, and (e) automatically estimating subject distance in response to applying blur differences to the multi-dimensional focus matching model.

The present invention provides a number of beneficial attributes which can be implemented either separately or in any desired combination without departing from the present teachings.

An element of the invention is an apparatus and method for accurately estimating subject distance in response to capturing two images at different focus settings (e.g., two picture matching).

Another element of the invention is the accurate estimation of subject distance despite motion arising between the images being compared.

Another element of the invention is a subject distance estimation apparatus and method which utilizes a set of matching curves for the camera which are obtained in a characterization process from which a blur difference model is created.

Another element of the invention is a subject distance estimation apparatus and method which generates a multi-dimensional polynomial model, preferably a four-dimensional polynomial model, to represent blur difference with respect to focus changes.

Another element of the invention is a subject distance estimation apparatus and method which generates a multi-dimensional polynomial model whose coefficients are chosen based on fitting based on mean square error, linear least square error, or similar, of the matching curve to the point of a desired convergence level.

Another element of the invention is a subject distance estimation apparatus and method which can properly estimate subject distance for different aperture settings (e.g., f-stop) and focal length (e.g., zoom) settings.

Another element of the invention is a subject distance estimation apparatus and method which can be implemented on fixed or removable lens camera devices without departing from the teachings of the present invention.

A still further element of the invention is that it can be implemented readily on a wide range of existing camera devices without the need of additional camera hardware.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focus points according to an element of the present invention.

FIGS. 2A-2B are comparisons of calibration target (e.g., step edge) images according to an element of the present invention.

DETAILED DESCRIPTION OF THE INVENTION

Figure 3:
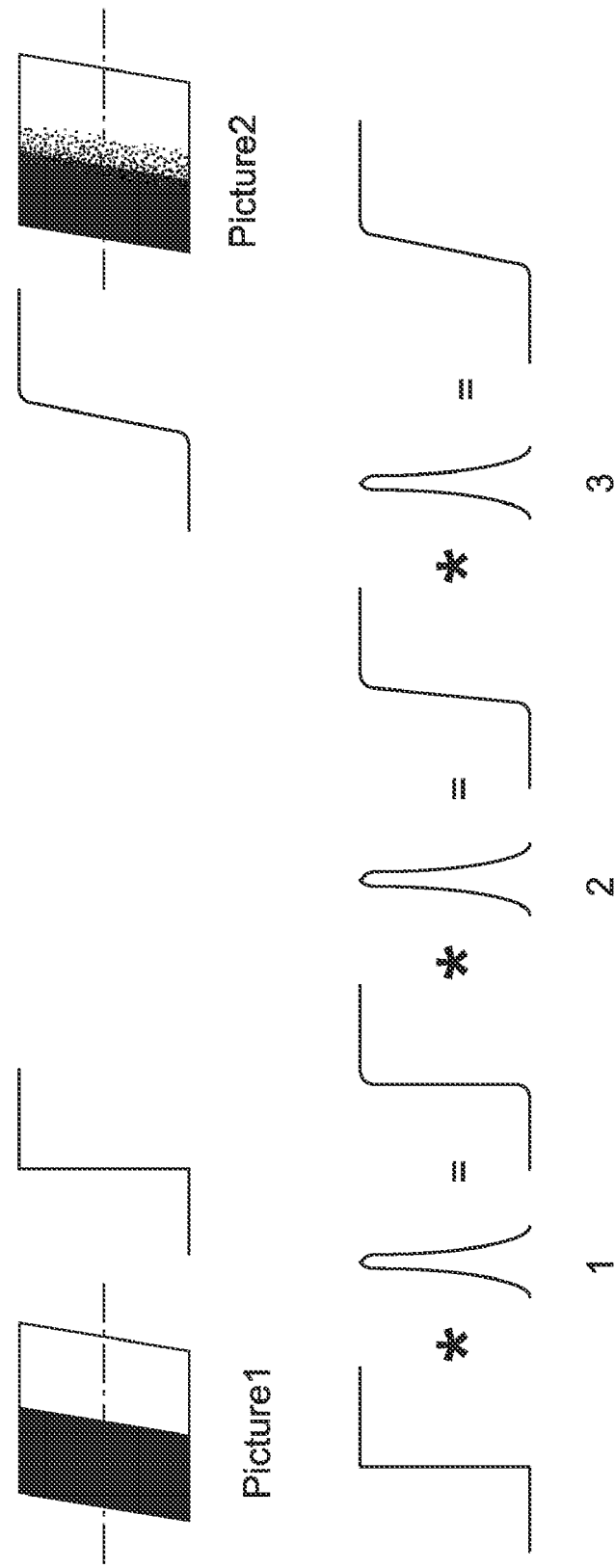
FIG. 3 is a schematic of computing blur difference in three iterations according to an element of the present invention.

Referring more specifically to the drawings, for illustrative purposes the present invention is embodied in the apparatus generally shown in FIG. 1 through FIG. 11. It will be appreciated that the apparatus may vary as to configuration and as to details of the parts, and that the method may vary as to the specific steps and sequence, without departing from the basic concepts as disclosed herein.

1. Blur Difference.

When a subject is properly in focus, the captured image is seen at its sharpest. The captured image becomes increasingly blurry ("blurrier") as the lens moves away from the in focus position. Generally, when two pictures are captured (taken) at two different focus distances, the image captured closer to the subject is sharper than the one captured farther away.

In the present invention, focus distances at which pictures are captured and the respective amount of blur difference between these pictures is utilized for estimating actual subject distance, or depth. This technique provides accurate depth estimates which compensate for subject motion. Accurate estimation of subject distance allows for proper adjustment of camera focus based on the distance estimates.

Considering the case of capturing two pictures $f_A$ and $f_B$ at positions A and B, with $f_A$ being sharper than $f_B$. The blur change can be modeled by a point spread function P from position A to B, as $$f_A * P = f_B$$

where * denotes two dimensional convolution.

It should be recognized that the term "point spread function" (PSF) describes the response of an imaging system to a point source or point object, this is often also referred to as an impulse response, such as found across a step edge for which an image is captured during camera characterization. In this context, the degree of spreading (blurring) of the point object is a measure of focus quality for the imaging system.

The term "convolution" as used herein describes a mathematical operation on two functions to produce a third function that is typically viewed as a modified version of one of the original functions. Often the second function is reversed and overlays a portion of the first function, toward more properly modeling a given data set.

FIG. 1 illustrates an embodiment 10 of capturing images in the process of creating a set of matching curves to characterize a given camera-lens system, hereafter referred to simply as a camera. Multiple images are captured of a calibration target (or calibration subject), at different focus positions (subject-distances) when collecting a data set for a given imaging apparatus (e.g., specific embodiment, make or model of camera, or a family of cameras using the same/similar optical imaging elements). Collecting the data set comprises a characterization process for the camera-lens system at a given magnification setting (e.g., lens at a fixed focal length—"zoom" setting). An imaging device (camera) 12 is shown which can focus from a minimum focal distance 14 on out to infinity 16. Minimum focal distance 14 (e.g., in this case 35 cm) is shown as well as focus at infinity 16. According to the invention, the focus converges to a first focus position 18 and then to a second focus position 20, for example upon a calibration target 22, such as step-edge image, slate, graticule, or similar target having known optical characteristics, along focal path 24.

By way of example and not limitation, a Sony camera was used herein to illustrate the inventive method, although one of ordinary skill in the art will appreciate the method can be utilized with other digital still and/or video cameras. The focusing distance of this camera ranges between the minimal focus distance (e.g., 35 cm) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different elements of video capture and output.

FIG. 2B depicts the image detection condition 36 as the image of object 38 becomes increasingly blurry as the lens moves away from the 'in-focus' position, with a resulting sloped contrast curve 40 shown. The focus distances at which the pictures are taken and the amount of blur difference between these two pictures can be utilized to estimate actual subject distance, or depth.

The point spread function P can be approximated by using a series of convolutions by a blur kernel K.

$$P = K * K * \ldots * K \quad (1)$$

In the example embodiment described herein, the kernel K was chosen to be the following.

$$K = \frac{1}{48} \begin{pmatrix} 1 & 4 & 1 \\ 4 & 28 & 4 \\ 1 & 4 & 1 \end{pmatrix} \quad (2)$$

Then the amount of blur difference between $f_A$ and $f_B$ can be measured by the number of convolutions in Eq. 1. It will be appreciated that this blur kernel represents a uniform amount of blur, and can be configured in a number of different ways and represents a wide range of values without departing from the teachings of the present invention. In actual implementation, the blur difference is obtained by an iteration process given by the following.

$$I_{A\_B} = \underset{I}{\arg\min} \left\| f_A * \underbrace{K * K * \ldots * K}_{I_{convolutions}} - f_B \right\| \quad (3)$$

where $\|.\|$ denotes a norm operator that evaluates the blur matching error between $f_A$ and $f_B$.

FIG. 3 illustrates an iteration process, herein exemplified with three iterations performed between picture $f_A$ (left) and picture $f_B$ (right).

2. Motion Compensation.

The present invention provides motion compensation when the depth estimation images are captured under conditions of relative motion between the subject and camera, for example if the subject is moving, or the camera is moving, or both are in motion. The motion compensation technique assures that the blur difference computation is performed in response to blur differences and not from relative motion between the capture of the first and second depth estimation images.

Figure 4A:
FIGS. 4A-4B are schematics of motion estimation and compensation utilized according to an element of the present invention.
Figure 4B:
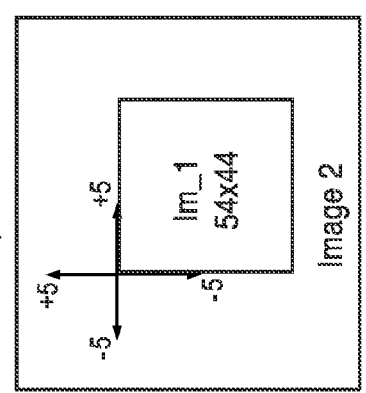

FIGS. 4A-4B illustrate an example of motion compensation utilized according to an element of the invention, showing a focus area in FIG. 4A of any desired size (herein depicted as 54×44 pixels) from a first image, for which motion estimation and/or compensation is performed in relation to a second image shown in FIG. 4B. For the [−5,5]×[−5,5] area total mean-squared error (MSE) is calculated. During motion compensation the focus area from the first image is located as a fit within the second image. The selection is based on picking the one with minimum number of absolute convolution number when the iteration converges In accord with this it is assumed that the amount of motion of image 2 in FIG. 4B is up to ±5 pixels vertically and horizontally. Each possible shift of image 2 is then examined within this [−5,5]×[−5,5] range. For each shift, a blur difference is calculated between the focus area of image 1 and the shifted region of the same size from image 2 and an iteration number is obtained. From all the iteration numbers obtained from all shifts within the [−5,5]×[−5,5] range, one is picked having a minimum absolute value. The corresponding shift that gives this minimum absolute value of the iteration number is the motion estimation for image 2 in FIG. 4B. It is assumed that every pixel of focus area shown in FIG. 4A has the same amount of displacement within the area of interest in the image depicted in FIG. 4B, for which a motion vector is ascribed and determined.

Letting $(x_v, y_v)$ denote the amount of pixel location shift $(x,y)$ in $f_B$ the amount of motion can be estimated. In one practical implementation $(x_v, y_v)$ is considered within a specified search range such as $[-5,5] \times [-5,5]$. Assuming $f_A$ is sharper than $f_B$. The blur difference is computed as follows.

$$I_{A\_B} = \min_{(x_V, y_V)} \left[ \arg\min_{l} \left\| f_A(x, y) \underbrace{* K(x, y) * K(x, y) * \ldots * K(x, y)}_{l\ convolutions} - f_B(x - x_V, y - y_V) \right\| \right] \quad (4)$$

For computational efficiency, the above process can be approximated by performing motion compensation before computing blur difference.

$$(\hat{x}_V, \hat{y}_V) = \arg\min_{(x_V, y_V)} \| f_A(x, y) - f_B(x - x_V, y - y_y) \| \quad (5)$$

Let $f_B^V(x,y) = f_B(x - \hat{x}_v, y - \hat{y}_v)$. Then the blur difference is given by the following relation.

$$I_{A\_B} = \arg\min_{l} \left\| f_A \underbrace{* K * K * \ldots * K}_{l} - f_B^V \right\| \quad (6)$$

In addition, elements of the present invention allow motion compensation to be performed across several convolutions, for example M convolutions, toward improving accuracy as follows.

$$(\hat{x}_V, \hat{y}_V, \hat{l}_V) = \arg\min_{(x_V, y_V, l)} \left\| f_A(x, y) \underbrace{* K(x, y) * K(x, y) * \ldots K(x, y)}_{l\ convolutions\ with\ l \leq M} - f_B(x - x_V, y - y_V) \right\| \quad (7)$$

Then the blur difference may be calculated as follows.

$$I_{A\_B} = \min \left\{ \hat{l}_V, \arg\min_{l} \| f_A(x, y) \underbrace{* K(x, y) * K(x, y) * \ldots K(x, y)}_{l\ convolutions} - f_B(x - \hat{x}_V, y - \hat{y}_V) \| \right\} \quad (8)$$

In summarizing the above, Eq. 4 provides the highest accuracy but is the slowest, while Eq. 6 provides the least accurate yet is the fastest to compute. The performance of Eq. 8 lies somewhere between that of Eq. 4 and Eq. 6. In the majority of actual applications, Eq. 6 should provide sufficient accuracy in most cases, while utilizing Eq. 8 with M=1 or 2, provide superior results.

3. Matching Curves.

A matching curve is a relationship between the iteration number and the lens focus position. In order to obtain the matching curve, a sequence of pictures is captured across the focus range of the lens, and blur difference is determined between every two pictures. By way of example and not limitation, the example embodiments describe use of a step-edge image placed at a fixed subject distance (e.g., 10 cm). This process can be referred to in many ways without departing from the teachings of the present invention, such as being a form of characterization of the camera-lens system, or as a calibration procedure, or as a process of generating matching curves, or similar phrasing.

Figure 5:
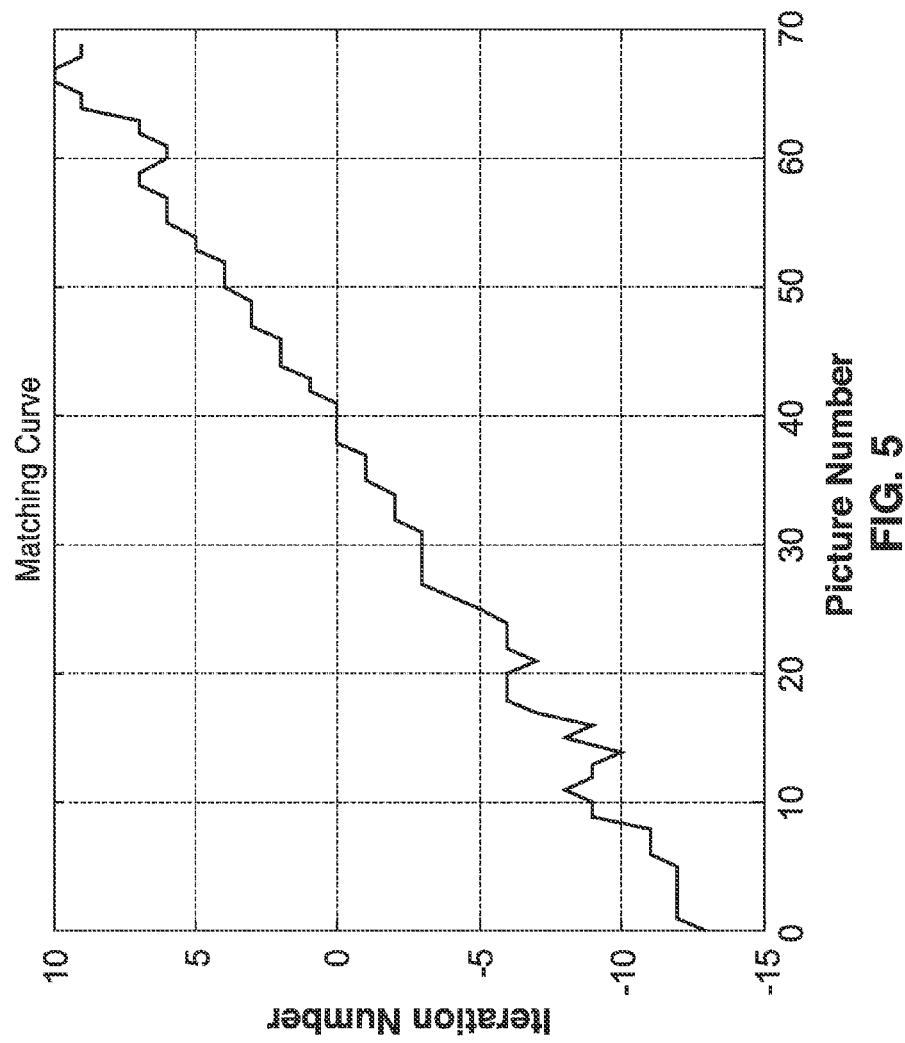
FIG. 5 is a graph of a matching curve collected according to an element of the present invention and showing the inclusion of outliers and noise.

FIG. 5 depicts a matching curve obtained for an image of a step-edge placed at a fixed distance. In creating the matching curves, a first picture of the sequence is captured at a focus distance of infinity, then one picture is captured each time the lens is adjusted to focus at one depth of field closer, until the lens reaches minimal focus distance. This sequence of pictures is denoted by $f_0, f_1, \ldots, f_{N-1}$ where N is the length of the sequence. In practice, to ensure the sequence covers the whole focus range, $f_0$ is preferably captured at a distance slightly further than a focus setting of "infinity", while $f_{N-1}$ is preferably captured at a focus setting which is slightly closer than the specified minimal focus distance.

In the following descriptions, Eq. 6 is used as an example to illustrate matching curve generation. It should be appreciated that other equations for determining blur difference, such as Eq. 3, Eq. 4, and Eq. 8, can be applied in a similar way without departing from the teachings of the present invention.

Before computing blur difference, it is preferable to determine which of the pictures is sharper; for example which of a sequence of two pictures $f_i$ and $f_j$, with i<j in the sequence, is sharper. It will be recognized that sharpness determines the amount of detail an image can convey, and is maximized for a given camera configuration when focus is at its most accurate; that is when the focus position (distance) exactly matches the subject position (distance).

First, motion compensation is performed, such as according to the following relation.

$$(\hat{x}_V, \hat{y}_V) = \arg\min_{(x_V, y_V)} \| f_i(x, y) - f(x - x_V, y - y_V) \| \quad (9)$$

Let $f_j^V(x,y) = f_j(x - \hat{x}_v, y - \hat{y}_v)$. The following two equations allow determining which of the images $f_i$ or $f_j$ is the sharper image.

$$I_1 = \arg\min_{l} \left\| f_i \underbrace{* K * K * \ldots * K}_{l\ convolutions} - f_j^V \right\| \quad (10)$$

$$I_2 = \arg\min_{l} \left\| f_j^V \underbrace{* K * K * \ldots * K}_{l\ convolutions} - f_i \right\| \quad (11)$$

If $I_1$ is larger than $I_2$, then $f_i$ is sharper than $f_j$, and the blur difference will be given by $I_1$. Otherwise if $I_2$ is larger than $I_1$, then $I_2$ is sharper and the blur difference will be given by $-I_2$. It should be noted that the sign of the blur difference values is used as a convenient means of denoting which image is sharper.

If $I_1$ and $I_2$ are equal, then the errors are compared.

$$e_1 = \left\| f_i \underbrace{*K*K\ldots*K}_{I_1 \text{ convolutions}} - f_j^V \right\| \quad (12)$$

$$e_2 = \left\| f_j^V \underbrace{*K*K*\ldots*K}_{I_2 \text{ convolutions}} - f_i \right\| \quad (13)$$

In FIG. 5 the relationship between iteration number and focus positions are shown for the depth of 10 cm. The example sequence was captured by a Sony DSC-HX1 camera having a focal length of 40 mm and an aperture setting of 0.5. In this example, the blur difference of $f_i$ and $f_{i+4}$ is determined for i=0, ..., N−5. The "picture number" axis indicates the image pairs for which the iteration number is calculated. For example, picture number 0 means that the iteration number is calculated between $f_0$ and $f_4$. It can be seen that the iteration number in these examples, increases as lens focus position moves away from the subject distance. The zero-crossing point occurs when the subject is in focus.

Figure 6:
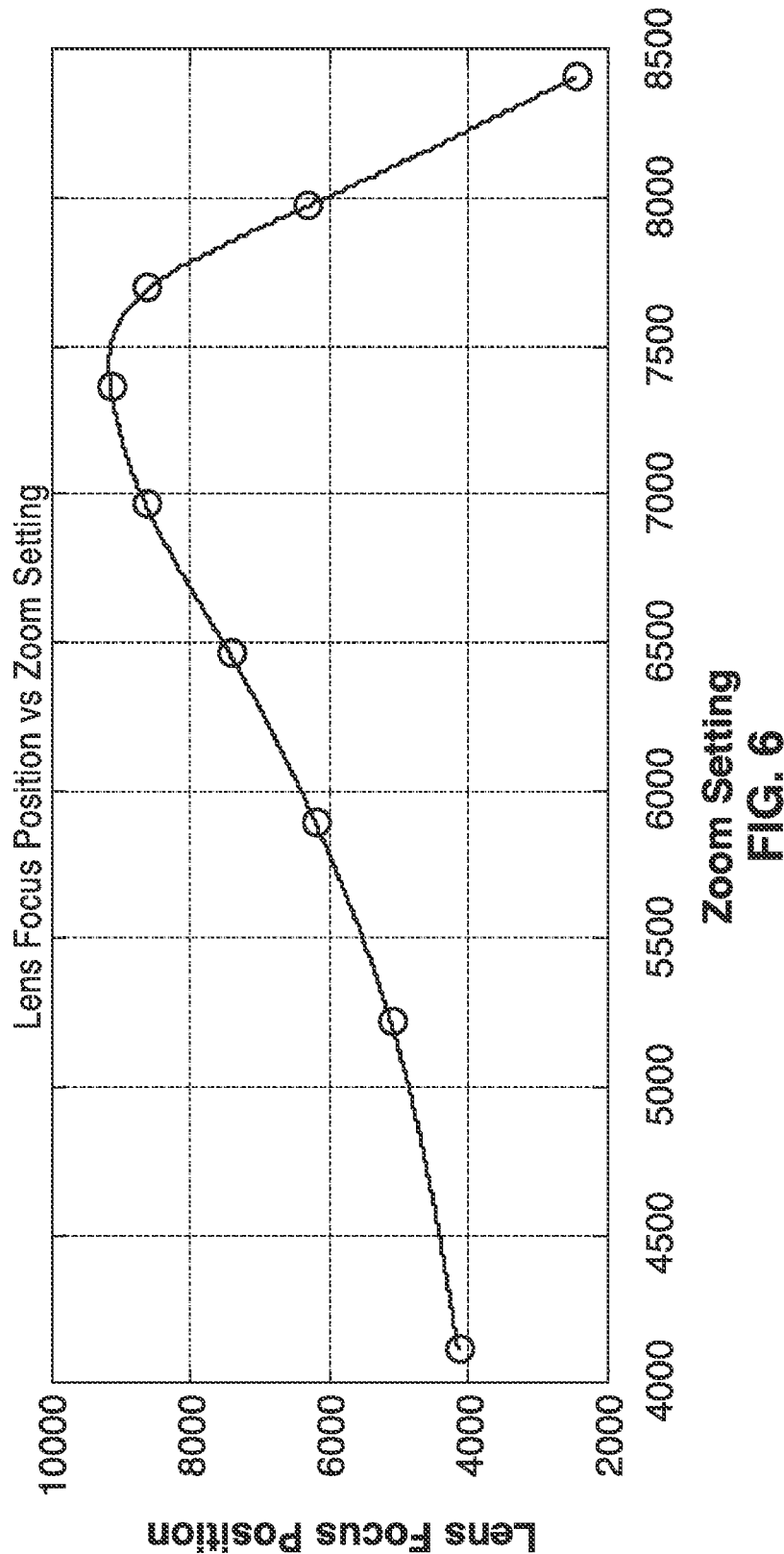
FIG. 6 is a graph of lens focus position in response to zoom settings for a camera device according to an element of the present invention.

FIG. 6 depicts an example of characterizing the interrelation between zoom setting and lens focus position for the camera system. The graph shows changes in lens focus settings in response to camera zoom setting. The data was captured using a nine image sequence focused at infinity, with intermediate positions being graphed in response to cubic spline interpolation. The present invention can be utilized for determining an accurate focus setting regardless of whether a simple lens or a zoom lens is utilized, as the focal length of the lens is taken into account in the depth estimation process. It should also be appreciated that matching curves may be generated for any desired granularity of zoom change, with zoom characterization provides a means for interpolating intermediate values.

4. Four Dimensional Polynomial Model.

Blur difference I can be written as a function of subject depth D (distance from camera lens to subject), focus distance L (focus setting), the aperture A (f-number), and focal length Z (zoom setting).

$$I = F(D, L, A, Z) \quad (14)$$

Depth D and focus distance L are both measured by picture number, which physically means the number of depths of field measured from a focus on infinity, or from where picture 0 is defined. Depth estimation is a process to determine D given I, L, A and Z.

It should be appreciated that in certain applications, such as in response to fixed apertures or zooms, the present invention can be implemented using a three dimensional polynomial model. Alternatively, if both aperture and zoom are fixed, then a two dimensional polynomial representation may be selected. It will be appreciated that these lower order functions are less general in applicability as they cannot be scaled up.

In one element of the present invention, a four-dimensional polynomial is utilized to model the camera-lens system characterization provided by the matching curves.

$$I = \sum_{i=0}^{m} \sum_{j=0}^{n} \sum_{k=0}^{p} \sum_{l=0}^{q} C(i, j, k, l) D^i L^j A^k Z^l \quad (15)$$

The term "polynomial" as applied for modeling a matching curve is a polynomial function, such as having the general form, $$y = a_n x^n + a_{n-1} x^{n-1} + \ldots + a_2 x^2 + a_1 x^1 + a_0$$

which is an example of a one-dimensional polynomial in which n is a non-negative integer that defines the degree of the polynomial. It will be noted that a polynomial with a degree of 4 is a quartic, of degree 3 is a cubic, of degree 2 is a quadratic, of degree 1 is a line and finally of degree 0 is a constant. Polynomial equations can be used for modeling a wide range of empirically determined relationships.

Since the zero-crossing point corresponds to the focus position, a boundary condition of I=0 arises when L=D.

The coefficients of the four-dimensional polynomial are determined by applying linear least squares polynomial fitting, or other desired mathematical fitting technique, to a set of matching curves. As previously described, the matching curves were generated in this embodiment by placing a step edge image at different subject distances and with using different focal length and aperture settings. In the example embodiment using a Sony DSC-HX1 camera, about 300 matching curves were utilized for determining a four dimensional polynomial model. The degree of the polynomial, m, n, p, and q are chosen in response to use of specific lenses and applications. For the DSC-HX1 camera utilized in testing the example embodiment, values of m=n=p=q=2 worked sufficiently well.

It should be appreciated that the matching curves obtained from different focal lengths and apertures may have different starting and ending focus positions. These curves utilize a common origin in order to create a polynomial model. In the present example, focus at infinity is considered as the origin, and for instance the picture taken at an infinite focus distance is always defined herein as picture number 0.

The procedure for finding optimal coefficients C(i, j, k, 1) can be summarized as follows.

1. Finding the four dimensional polynomial which fits Eq. 15 for the matching curve data using linear least squares, or similar, polynomial fitting subject to the following.

$$\sum_{\{(i,j)|i+j=c\}} C(i, j, k, l) = 0 \text{ for any } c \in \{0, \ldots, m+n\} \quad (16)$$

2. Calculating fitting error for each matching curve data point. Discarding any data points that give overly large fitting errors (e.g., larger than twice the standard deviation of all the fitting errors), for the purpose of removing outliers.

It should be recognized that the term "outlier" is a statistical term indicating that one or more observations in the empirical data set are numerically distinct or separate from the remainder of the data set. Outlier points may indicate systemic shortcomings, faulty data, and so forth, although a small number of outliers are expected in any large sample sets. Attempting to model the data set including the "outliers" could lead to a misleading model, wherein they are typically discarded once it is assured they do not properly represent characteristics of the underlying function.

3. Repeating steps 1 and 2 above, until the polynomial fitting converges to a desired level of accuracy.

Figure 7:
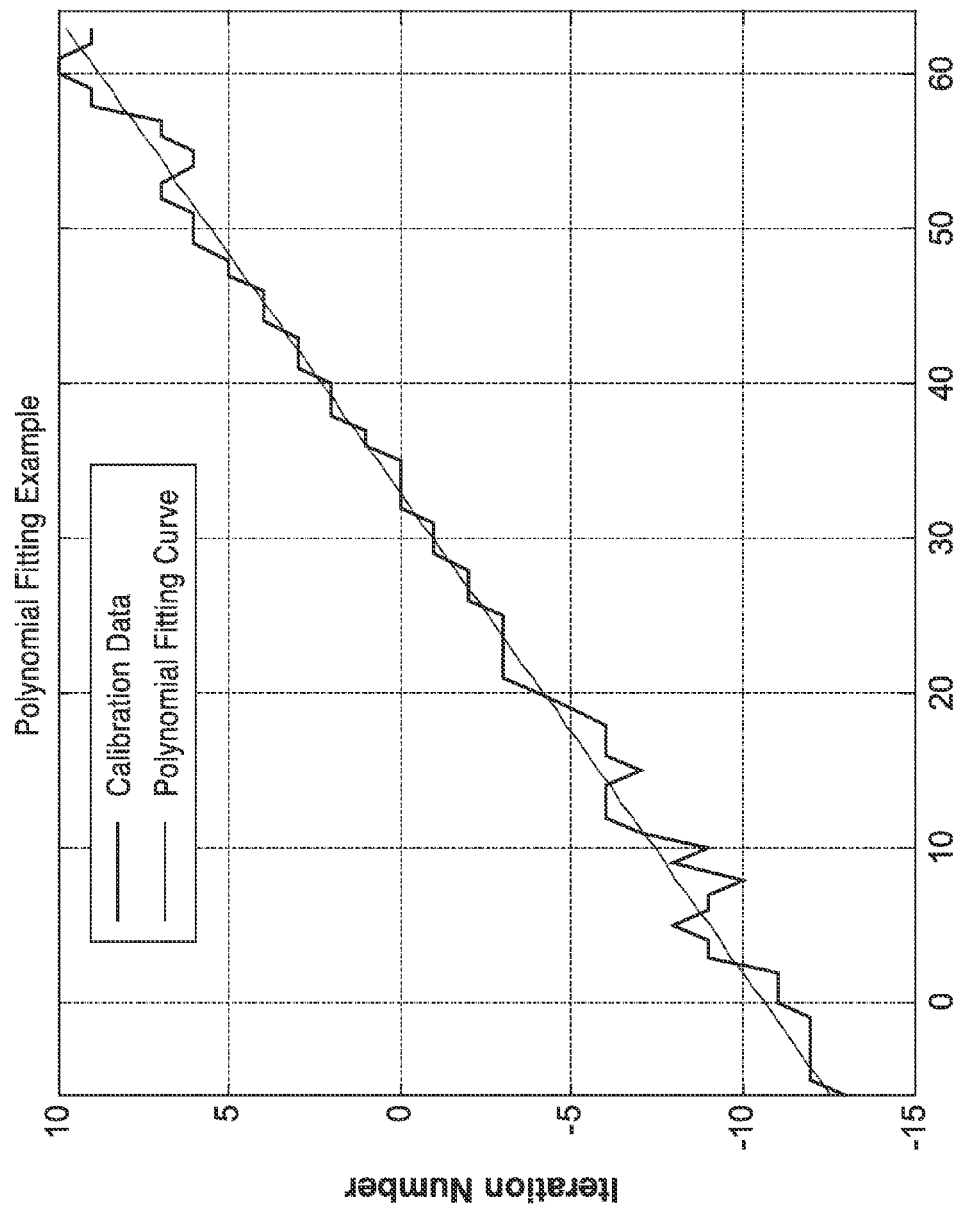
FIG. 7 is a graph of polynomial fitting of a matching curve according to an element of the present invention.

FIG. 7 illustrates the result of polynomial curve fitting on a matching curve as depicted by the narrow line amidst the broader line of the empirically determined matching curve data.

5. Depth Estimation.

Utilizing the model presented in Eq. 15, depth estimation can be performed accurately and in a straightforward manner according to the present invention. During subject distance estimation, such as within an automatic focus (auto focus (AF)) process, focal length and aperture settings are known and fixed. At least two images are captured at different focus positions for determining subject distance.

Motion estimation and compensation, as previously described, is preferably performed before determining the blur difference between the images, so that any motion between the captured frames will not negatively impact blur difference determinations.

Blur difference between the two pictures is then calculated. In response to which Eq. 15 becomes a single variable polynomial equation. The equation is solved for D, which is the estimated depth of the object. It should be appreciated that D may be represented by any desired format, such as an integer, fixed point number, or floating point number. For auto focus applications, the lens can be moved to focus at distance D, and the new depth then estimated in the same manner. The procedure is repeated until the iteration number converges to 0, or below some specified threshold to assure accurate focus has been attained.

6. Programming for Executing Depth Estimation.

Portions of the depth estimation method according to the present invention are carried out by programming executable on a computer processing device, preferably one or more embedded microprocessors or microcontrollers within a camera device for which the depth estimation is being performed.

Figures 8, 9:
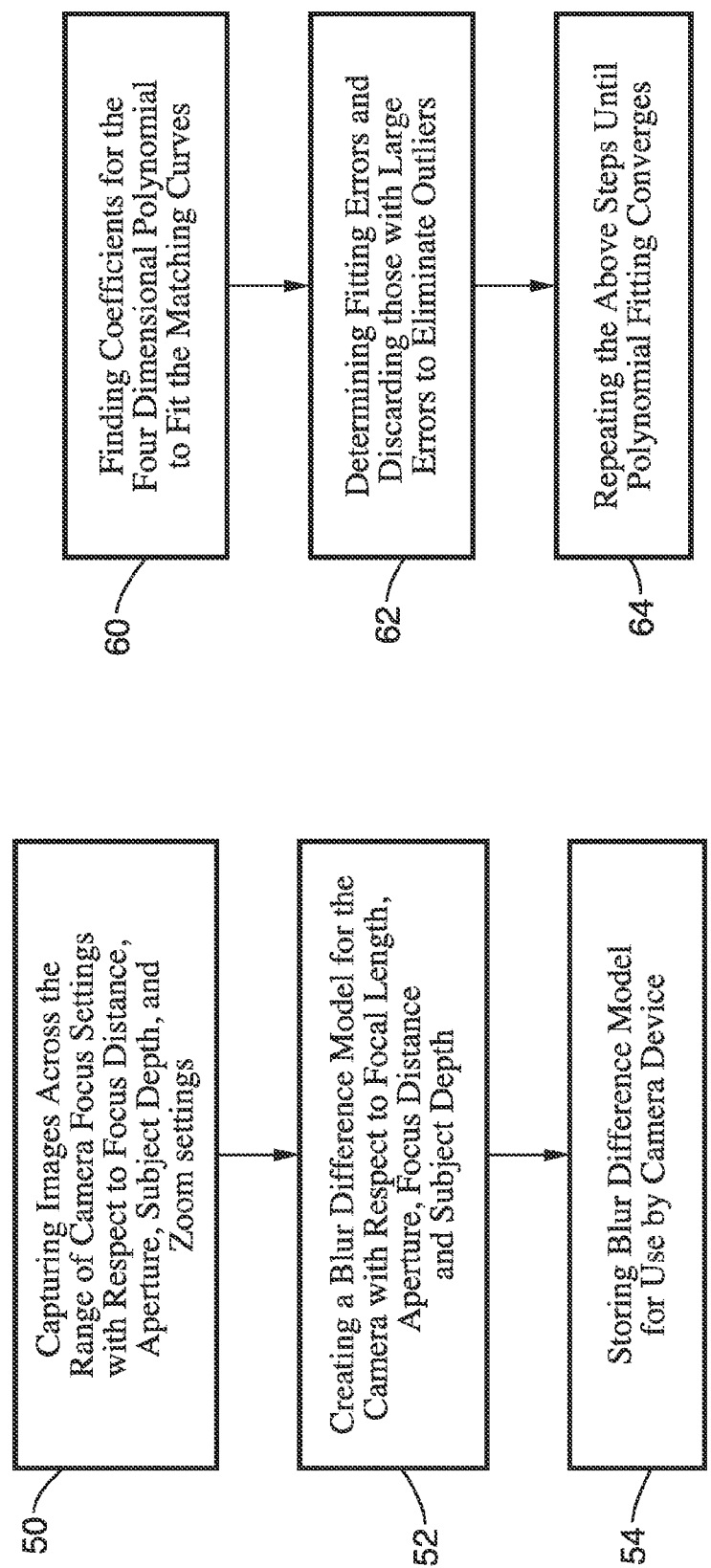
FIG. 8 is a flowchart of camera characterization according to an element of the present invention.
FIG. 9 is a flowchart of creating a blur difference model according to an element of the present invention.

FIG. 8 illustrates an example embodiment of programming for performing characterization of a camera device in preparation for performing depth estimation according to the invention, such as within programming for controlling automatic focusing. Images are captured across a range of camera focus settings, and with respect to focus distance as well as in regard to aperture, subject depth and zoom settings as represented by step 50. The data from the characterization is processed into a set of matching curves from which a blur difference model is generated as per step 52 for a given configuration (e.g., aperture, zoom setting, distance to subject) between two focus settings. It was previously mentioned in the example implementation for the Sony DSC-HX1 camera, that about 300 matching curves were utilized in determining the described four-dimensional polynomial model. The blur difference model is stored in the camera device as described in step 54 for use during camera operation. It should be appreciated that the above steps are preferably performed for a given camera model, and preferably this blur difference model is stored in the camera during its manufacture.

FIG. 9 illustrates by way of example and not limitation converting the set of matching curves into a blur difference model (e.g., I=F(D, L, A, Z)), and more particularly into a four dimensional polynomial blur difference model. In step 60 coefficients are found for the four dimensional polynomial which is used to model the matching curves for the camera. Fitting errors are determined and outliers removed as depicted in step 62. Then the process is repeated as indicated in step 64, wherein the polynomial coefficients are modified to finding an improved fit as per step 60, and fitting errors checked again in step 62, until the polynomial model converges to match the data of the matching curves.

Figure 10:
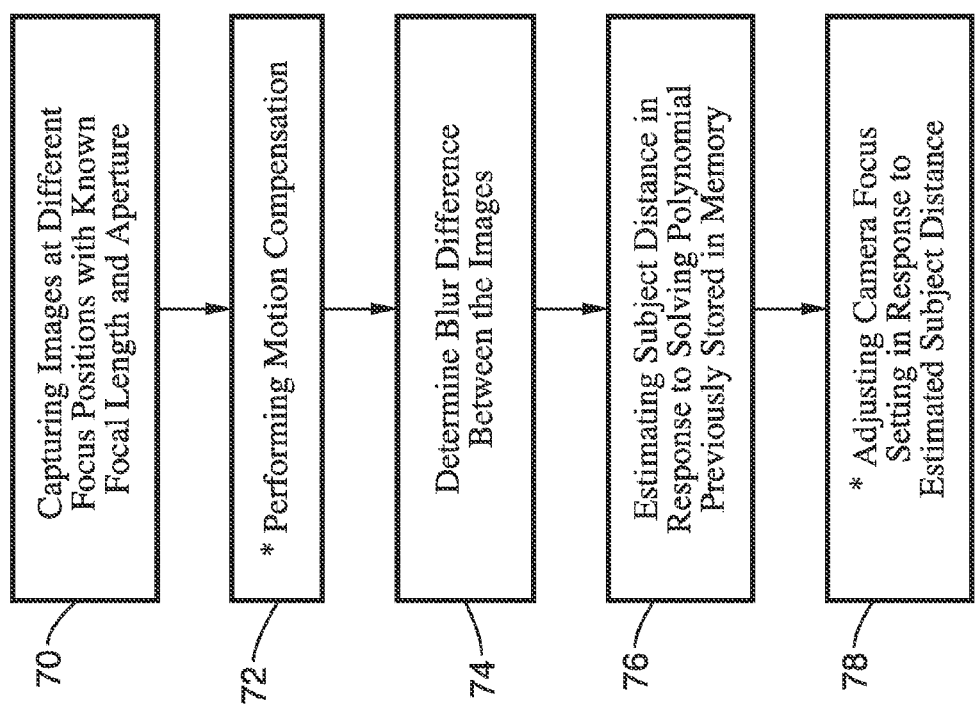
FIG. 10 is a flowchart of performing depth estimation according to an element of the present invention.

FIG. 10 illustrates utilizing depth estimation according to an embodiment of the invention, in which the blur difference model is accessible to the camera device, and preferably stored within the camera as a data set describing the four dimensional polynomial blur difference model. Images are captured during camera operation at different focus positions as represented at step 70. It will be appreciated that lens focal length is known while the aperture and zoom settings under which the images were captured are known by the camera device and stored, and thus the programming registers these settings. In addition, the focus settings used for capturing the at least two different images are also stored for use with the blur difference model.

Preferably motion compensation is performed between the captured images as shown in optional step 72 (optional step denoted with "*"). It will be appreciated by way of example and not limitation, that implementations of the invention may bypass motion compensation, such as in response to camera mode (e.g., landscape, or still setting), or in response to detection of static conditions between the captured images. However, it should be appreciated that although performing motion compensation requires processing overhead, its application even across static (unchanging) images does not introduce error or noise or otherwise negatively impact subject depth estimation accuracy. Therefore, as motion can readily arise between these captured frames, it may be more preferable to always perform the motion compensation step when estimating distance according to the invention.

Blur difference is then determined between the motion compensated images as per step 74. The blur difference is then used with the stored blur difference model to solve for subject distance as shown in step 76.

In at least one embodiment of the invention, the estimated subject distance is utilized within focus control programming, such as within an auto-focus routine, to adjust the camera focus as described in optional (optional nature denoted with "*") block 78.

Figure 11:
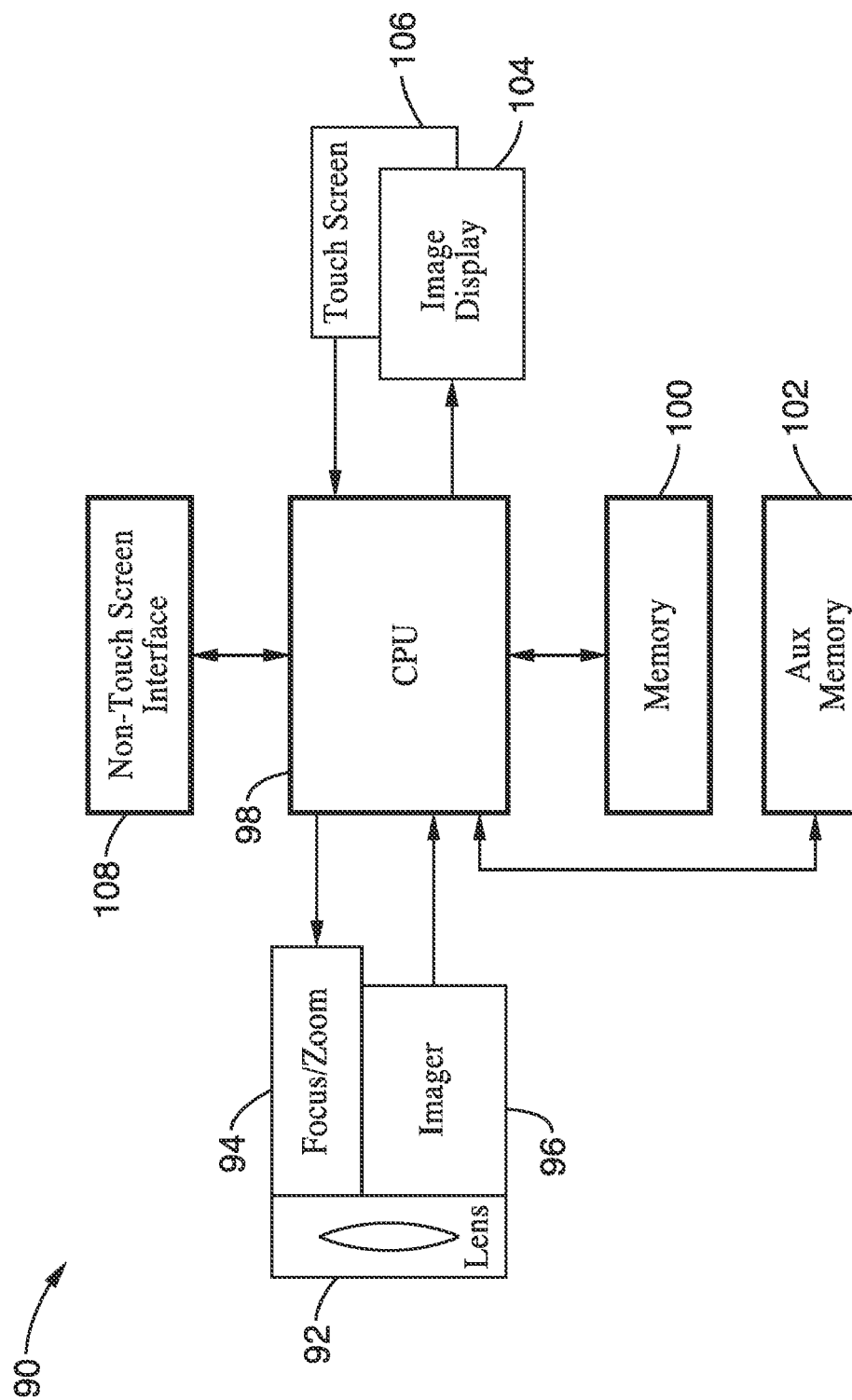
FIG. 11 is a block diagram of a camera system generating depth estimates according to an element of the present invention.

FIG. 11 illustrates an example embodiment 90 of a camera configured with subject depth estimation rendering according to the invention. It should be appreciated that elements of the present invention can be implemented on a variety of camera and image processing devices without departing from the teachings of the present invention, the following being described by way of example and not limitation.

An image capture device (camera) 90 is shown configured with a lens system 92 and its associated optics, while a focus control 94 is configured for performing focus adjustments according to the invention on the lens system. Focus control 94 may be optionally configured on a camera system to provide changing focal length, such as switching between normal and macro settings, or providing a zoom control to allow user selection of image magnification. An imager 96 is configured for receiving light reflected from the subject through lens system 92, whose focus and optionally zoom has been set manually or is controlled by camera device programming, so as to capture an image digitally.

Operation of camera 90 is controlled by one or more computer processors (central processing units—CPUs) 98 and associated memory 100 (e.g., internal to the CPU, or in one or more separate integrated circuits). An auxiliary memory 102 is also shown by way of example, such as a memory card upon which captured images, and other data may be stored. The blur difference model is preferably stored in memory on the camera device for rapid access when estimating subject distance, such as when performing focusing. It will be appreciated that the processing performed by camera device 90 may by performed by a single processor for performing camera control functions as well as the image processing elements described according to the present invention, or it may utilize multiple processors, such as one for the camera control functionality and one or more processors for performing image processing functionality. One of ordinary skill in the art will appreciate that the programming may be performed in various ways across multiple processors.

Computer processor 98 performs depth of field rendering according to the invention on images captured with camera 90. Shown by way of example are an optional image display 104 and touch screen 106, however, it will be appreciated that the method according to the present invention can be implemented on various image capture devices which are configured with an imager and associated lens and focus control element. An optional non-touch screen interface 108 is also shown to indicate that the controls for the camera may utilize any desired forms of user interface. It will be appreciated that subject distance estimation and/or auto focus control according to the present invention can display subject distance information and/or have its operating characteristics modified in response to various mechanisms utilizing user input/output 104, 106 and/or 108.

It should be appreciated that the subject depth estimation according to the invention is performed by programming executable on computer processor 98 in combination with memory 100 and/or auxiliary memory 102. This programming can be loaded into the camera at the time of manufacture, downloaded into the camera after manufacture, or otherwise loaded into the camera. It will be appreciated that the control firmware of the camera can be modified for example by coupling a communication port of the camera to a personal computer from which software containing the new programming can be executed to download new firmware into the camera device.

It should also be appreciated that the present invention is not limited to use on cameras having a fixed (non-removable) lens system 92. The present invention is capable of supporting interchangeable lenses 92 while providing correct subject distance estimates which are uniquely tailored to each lens. In one example, consider a camera for which the manufacturer markets a family of lenses. Interfacing is provided between lens system 92 and CPU 98 to allow the processor to detect which lens system is coupled to the camera, such mechanisms for detecting lenses are well known in the art. It is well recognized that a lens "system" often contains more than optical elements (thus the term "system"), and may contain other optics, mechanisms, and electronics for integrating the lens with the body of the camera. In one implementation on a camera having interchangeable lenses, the camera manufacture characterizes the camera with each of the lenses in the family of lenses to create associated blur difference models. The blur difference models for each of these lenses may be preloaded into the camera at the time of manufacture, or the manufacturer may provide downloads of new blur difference models with each lens purchased. Alternatively, each lens system may contain memory upon which the blur modeling information is stored. It will also be appreciated that blur difference models can be modified in response to changing a lens based on the different properties of a new lens in comparison to the one for which the camera characterization was performed. Thus, it will be appreciated that the present invention can be implemented on fixed and removable lens imaging devices without departing from the teachings of the present invention.

Inventive teachings can be applied in a variety of camera apparatus and applications which may benefit from enhanced subject distance estimation or automatic focus capability, such as including digital still cameras, video cameras and so forth. Although the present invention is particularly well-suited for use on still cameras, it will be appreciated that many video cameras provide still camera functionality with the capture of single frames. In addition, it should be appreciated that the techniques described herein can be applied to certain conditions arising during video capture, such as without limitation in response to correcting loss of focus, in which frames are obtained at different focus positions and a proper focus position is sought to regain proper focus in the sequence of captured frames.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer coupled to an image capture device, such that the computer program instructions which execute on the computer or other programmable processing apparatus comprise means for implementing the functions specified in the block(s) of the flowchart(s).

Accordingly, blocks in the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware as desired which perform the specified functions or steps, either separately, or more preferably in combination with computer execution means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the foregoing, it will be appreciated that the present invention provides methods and apparatus for estimating depth of field and/or controlling depth adjustment during a camera autofocus process. Inventive teachings can be applied in a variety of apparatus and applications, including still camera, video cameras, various imaging devices directed to a subject at a variable depth, and so forth. As can be seen, therefore, the present invention includes the following inventive embodiments among others:

1. An apparatus for electronically capturing images, comprising: an imaging element disposed on an image capture apparatus; a focus control element coupled to said imaging element; a computer processor coupled to said imaging element and said focus control element; a memory coupled to said computer processor and configured for retaining images captured from said imaging element and for retaining programming executable by said computer processor; a multi-dimensional focus matching model retained in memory as a multi-dimensional polynomial fitting blur differences from image matching curves captured across a range of different focal lengths; and programming executable on said computer processor for, (i) capturing multiple object images, including at least a first and second image, and registering focal length and aperture of said object images, (ii) compensating for motion between said multiple object images, (iii) determining blur difference between said multiple object images, and (iv) automatically estimating subject distance in response to applying blur difference to said multi-dimensional focus matching model.

2. An apparatus as recited in embodiment 1, wherein said multiple object images comprise at least two images captured at different focus positions using an identical aperture setting and focal length.

3. An apparatus as recited in embodiment 1, further comprising programming executable on said computer processor for automatically adjusting focus of said apparatus in response to said estimation of subject distance.

4. An apparatus as recited in embodiment 1, wherein during said compensating for motion at least one block from the first image is located as a fit within the second image.

5. An apparatus as recited in embodiment 1, wherein said compensating for motion is configured for being performed in response to one or more convolutions by a blur kernel to determine blur difference.

6. An apparatus as recited in embodiment 1, wherein said compensating for motion is performed according to, $$(\hat{x}_V, \hat{y}_V) = \arg\min_{(x_V, y_V)} \|f_i(x, y) - f_j(x - x_V, y - y_V)\|$$

in which two images $f_i$ and $f_j$ are captured in a sequence, with i<j indicating image i is taken earlier in the sequence than image j, with $\|.\|$ being a norm operator evaluating matching error, and focus area $f_i$ is compared with a shifted region of the same size from $f_j$, and with the amount of shift $(x_v, y_v)$ being up to a predetermined number of pixels in horizontal and vertical directions, whereby for all the shifting positions, $(\hat{x}_v, \hat{y}_v)$ is found that yields the minimum matching error.

7. An apparatus as recited in embodiment 6, wherein blur difference is determined in response to whether image $f_i$ or $f_j$ is sharper, and determined in response to, $$I_1 = \arg\min_l \left\| f_i \underbrace{*K*K*\ldots*K}_{l\ convolutions} - f_j^V \right\|,$$

and $$I_2 = \arg\min_l \left\| f_j^V \underbrace{*K*K*\ldots*K}_{l\ convolutions} - f_i \right\|,$$

in which $I_1$ and $I_2$ are first and second blur difference values, $f_i$ and $f_j$ are the two images captured, $f_j^V$ is the captured images in response to motion compensation, and K are blur kernels; wherein if $I_1$ is larger than $I_2$, then $f_i$ is sharper than $f_j$, and the blur difference will be given by $I_1$, otherwise if $I_2$ is larger than $I_1$, then $I_2$ is sharper and the blur difference will be given by $-I_2$; and wherein the sign of blur difference values indicates which image is sharper.

8. An apparatus as recited in embodiment 1, wherein said blur difference $I_{A\_B}$ is computed as, $$I_{A\_B} = \min_{(x_V, y_V)} \left[ \arg\min_l \| f_A(x,y) * \underbrace{K(x,y)*K(x,y)*\ldots*K(x,y)}_{l\ convolutions} - f_B(x-x_V, y-y_V) \| \right]$$

in which K are convolution operations, (x,y) is amount of pixel location shift, $(x_v, y_v)$ is the amount of pixel location shift within a given search range v, $f_A$ is a first picture and $f_B$ is a second picture.

9. An apparatus as recited in embodiment 1, wherein said blur difference $I_{A\_B}$ is approximated in response to letting $f_B^V(x,y) = f_B(x-\hat{x}_v, y-\hat{y}_v)$, and determining blur difference by the following relation, $$I_{A\_B} = \arg\min_l \left\| f_A \underbrace{*K*K*\ldots*K}_{l} - f_B^V \right\|$$

in which K are convolution operations, (x,y) is amount of pixel location shift, $(x_v, y_v)$ is the amount of pixel location shift within a given search range v, $f_A$ is a first picture, $f_B$ is a second picture, and $f_B^V$ is the second picture in response to motion compensation.

10. An apparatus as recited in embodiment 1, wherein said first and second images are captured temporarily toward estimating subject distance for a user selected image to be captured and retained in said memory.

11. An apparatus as recited in embodiment 1, wherein said image matching curves describe a relationship between iteration number and lens focus position.

12. An apparatus as recited in embodiment 1, wherein said focus matching model comprises a four-dimensional polynomial function of blur difference with respect to subject depth, focus position, focal length, and aperture.

13. An apparatus as recited in embodiment 1, wherein said focus matching model comprises a multi-dimensional polynomial function determined in response to the steps comprising: finding coefficients for the multi-dimensional polynomial to fit the blur difference matching curves; determining fitting errors and discarding outliers; and repeating the above steps until polynomial fitting converges to a desired accuracy with the blur difference matching curves.

14. An apparatus as recited in embodiment 1, wherein the imaging device comprises a still image camera, or a video camera having a still image capture mode.

15. An apparatus as recited in embodiment 1, wherein the focus matching model is generated by performing a characterization comprising: obtaining images of a calibration target in a sequence of calibration target images taken across a range of camera focus settings with respect to focus distance, aperture, subject depth and zoom settings; determining blur difference matching curves between each of said images; and generating said multi-dimensional model based on matching the blur differences for the sequence of calibration target images.

16. An apparatus for electronically capturing images, comprising: an imaging element disposed within a camera apparatus; a focus control element coupled to said imaging element; a computer processor coupled to said imaging element and said focus control element; a memory coupled to said computer processor and configured for retaining images captured from said imaging element and for retaining programming executable by said computer processor; a multi-dimensional focus matching model retained in memory as a multi-dimensional polynomial fitting blur differences from image matching curves captured across a range of different focal lengths which describe a relationship between iteration number and lens focus position; and programming executable on said computer processor for, (i) capturing at least two images, first image and second image, at different focus positions using an identical aperture setting and focal length, (ii) compensating for motion between said two images, (iii) determining blur difference between said two images, (iv) automatically estimating subject distance in response to applying blur difference to said multi-dimensional focus matching model, and (v) automatically adjusting focus of said camera by communicating focus control changes to said focus control element in response to said estimation of subject distance.

17. An apparatus as recited in embodiment 16, wherein during said compensating for motion, at least one block from the first image is located as a fit within the second image.

18. An apparatus as recited in embodiment 16, wherein said compensating for motion is configured for being performed in response to one or more convolutions by a blur kernel to determine blur difference.

19. An apparatus as recited in embodiment 16, wherein said multi-dimensional polynomial function comprises a four dimensional polynomial model of blur difference with respect to subject depth, focus position, focal length, and aperture.

20. A method of estimating subject depth within a camera apparatus for electronically capturing images, comprising: generating a multi-dimensional focus matching model for retention within the camera apparatus as a multi-dimensional polynomial fitting blur differences from image matching curves captured across a range of different focal lengths; capturing multiple object images, including at least a first and second image, and registering focal length and aperture; compensating for motion between said multiple object images; determining blur difference between said multiple object images; and automatically estimating subject distance in response to applying blur difference to said multi-dimensional focus matching model.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for electronically capturing images, comprising:

an imaging element disposed on an image capture apparatus;

a focus control element coupled to said imaging element;

a computer processor coupled to said imaging element and said focus control element;

a memory coupled to said computer processor and configured for retaining images captured from said imaging element and for retaining programming executable by said computer processor;

a multi-dimensional focus matching model retained in memory as a multi-dimensional polynomial fitting blur differences from image matching curves captured across a range of different focal lengths; and programming executable on said computer processor for, (i) capturing multiple object images, including at least a first and second image, and registering focal length and aperture of said object images, (ii) compensating for motion between said multiple object images, (iii) determining blur difference between said multiple object images, and (iv) automatically estimating subject distance in response to applying blur difference to said multi-dimensional focus matching model.

2. An apparatus as recited in claim 1, wherein said multiple object images comprise at least two images captured at different focus positions using an identical aperture setting and focal length.

3. An apparatus as recited in claim 1, further comprising programming executable on said computer processor for automatically adjusting focus of said apparatus in response to said estimation of subject distance.

4. An apparatus as recited in claim 1, wherein during said compensating for motion at least one block from the first image is located as a fit within the second image.

5. An apparatus as recited in claim 1, wherein said compensating for motion is configured for being performed in response to one or more convolutions by a blur kernel to determine blur difference.

6. An apparatus as recited in claim 1, wherein said compensating for motion is performed according to, $$(\hat{x}_V, \hat{y}_V) = \underset{(x_V, y_V)}{\operatorname{argmin}} \| f_i(x, y) - f_j(x - x_V, y - y_V) \|$$

in which two images $f_i$ and $f_j$ are captured in a sequence, with $i<j$ indicating image i is taken earlier in the sequence than image j, with $\|.\|$ being a norm operator evaluating matching error, and focus area $f_i$ is compared with a shifted region of the same size from $f_j$, and with the amount of shift $(x_v, y_v)$ being up to a predetermined number of pixels in horizontal and vertical directions, whereby for all the shifting positions, one $(\hat{x}_v, \hat{y}_v)$ is found that yields the minimum matching error.

7. An apparatus as recited in claim 6:
wherein blur difference is determined in response to whether image $f_i$ or $f_j$ is sharper, and determined in response to, $$I_1 = \operatorname*{argmin}_{I} \| f_i * \underbrace{K * K \ldots * K}_{I\,convolutions} - f_j^V \|,$$

and $$I_2 = \operatorname*{argmin}_{I} \| f_j^V * \underbrace{K * K * \ldots * K}_{I\,convolutions} - f_i \|,$$

in which $I_1$ and $I_2$ are first and second blur difference values, $f_i$ and $f_j$ are the two images captured, $f_j^V$ is the captured images in response to motion compensation, and K are blur kernels;
wherein if $I_1$ is larger than $I_2$, then $f_i$ is sharper than $f_j$, and the blur difference will be given by $I_1$, otherwise if $I_2$ is larger than $I_1$, then $I_2$ is sharper and the blur difference will be given by $-I_2$; and
wherein the sign of blur difference values indicates which image is sharper.

8. An apparatus as recited in claim 1, wherein said blur difference $I_{A\_B}$ is computed as, $$I_{A\_B} = \min_{(x_V, y_V)} \left[ \operatorname*{argmin}_{I} \| f_A(x,y) * \underbrace{K(x,y) * K(x,y) * \ldots * K(x,y)}_{I\,convolutions} - f_B(x - x_V, y - y_V) \| \right]$$

in which K are convolution operations, (x,y) is amount of pixel location shift, $(x_v, y_v)$ is the amount of pixel location shift within a given search range v, $f_A$ is a first picture and $f_B$ is a second picture.

9. An apparatus as recited in claim 1, wherein said blur difference $I_{A\_B}$ is approximated in response to letting $f_B^V(x,y) = f_B(x - \hat{x}_v, y - \hat{y}_v)$ and determining blur difference by the following relation, $$I_{A\_B} = \operatorname*{argmin}_{I} \| f_A * \underbrace{K * K * \ldots * K}_{I} - f_B^V \|$$

in which K are convolution operations, (x,y) is amount of pixel location shift, $(x_v, y_v)$ is the amount of pixel location shift within a given search range v, $f_A$ is a first picture, $f_B$ is a second picture, and $f_B^V$ is the second picture in response to motion compensation.

10. An apparatus as recited in claim 1, wherein said first and second images are captured temporarily toward estimating subject distance for a user selected image to be captured and retained in said memory.

11. An apparatus as recited in claim 1, wherein said image matching curves describe a relationship between iteration number and lens focus position.

12. An apparatus as recited in claim 1, wherein said focus matching model comprises a four-dimensional polynomial function of blur difference with respect to subject depth, focus position, focal length, and aperture.

13. An apparatus as recited in claim 1, wherein said focus matching model comprises a multi-dimensional polynomial function determined in response to the steps comprising:
finding coefficients for the multi-dimensional polynomial to fit the blur difference matching curves;
determining fitting errors and discarding outliers; and
repeating the above steps until polynomial fitting converges to a desired accuracy with the blur difference matching curves.

14. An apparatus as recited in claim 1, wherein the imaging device comprises a still image camera, or a video camera having a still image capture mode.

15. An apparatus as recited in claim 1, wherein the focus matching model is generated by performing a characterization comprising:
obtaining images of a calibration target in a sequence of calibration target images taken across a range of camera focus settings with respect to focus distance, aperture, subject depth and zoom settings;
determining blur difference matching curves between each of said images; and
generating said multi-dimensional model based on matching the blur differences for the sequence of calibration target images.

16. An apparatus for electronically capturing images, comprising:
an imaging element disposed within a camera apparatus;
a focus control element coupled to said imaging element;
a computer processor coupled to said imaging element and said focus control element;
a memory coupled to said computer processor and configured for retaining images captured from said imaging element and for retaining programming executable by said computer processor;
a multi-dimensional focus matching model retained in memory as a multi-dimensional polynomial fitting blur differences from image matching curves captured across a range of different focal lengths which describe a relationship between iteration number and lens focus position; and
programming executable on said computer processor for,
(i) capturing at least two images, first image and second image, at different focus positions using an identical aperture setting and focal length,
(ii) compensating for motion between said two images,
(iii) determining blur difference between said two images,
(iv) automatically estimating subject distance in response to applying blur difference to said multi-dimensional focus matching model, and
(v) automatically adjusting focus of said camera by communicating focus control changes to said focus control element in response to said estimation of subject distance.

17. An apparatus as recited in claim 16, wherein during said compensating for motion, at least one block from the first image is located as a fit within the second image.

18. An apparatus as recited in claim 16, wherein said compensating for motion is configured for being performed in response to one or more convolutions by a blur kernel to determine blur difference.

19. An apparatus as recited in claim 16, wherein said multi-dimensional polynomial function comprises a four dimensional polynomial model of blur difference with respect to subject depth, focus position, focal length, and aperture.

20. A method of estimating subject depth within a camera apparatus for electronically capturing images, comprising:
generating a multi-dimensional focus matching model for retention within the camera apparatus as a multi-dimensional polynomial fitting blur differences from image matching curves captured across a range of different focal lengths;

capturing multiple object images, including at least a first and second image, and registering focal length and aperture;

compensating for motion between said multiple object images;

determining blur difference between said multiple object images; and automatically estimating subject distance in response to applying blur difference to said multi-dimensional focus matching model.

* * * * *